(12) United States Patent
Du et al.

(10) Patent No.: US 10,254,479 B2
(45) Date of Patent: Apr. 9, 2019

(54) HIGHLY EFFICENT ON-CHIP DIRECT ELECTRONIC-PLASMONIC TRANSDUCERS

(71) Applicant: National University of Singapore, Singapore (SG)

(72) Inventors: Wei Du, Singapore (SG); Tao Wang, Singapore (SG); Christian Albertus Nijhuis, Singapore (SG)

(73) Assignee: National University of Singapore, Singapore (SG)

( * ) Notice: Subject to any disclaimer, the term of this patent is extended or adjusted under 35 U.S.C. 154(b) by 209 days.

(21) Appl. No.: 15/445,408

(22) Filed: Feb. 28, 2017

(65) Prior Publication Data

US 2017/0254952 A1  Sep. 7, 2017

(30) Foreign Application Priority Data

Mar. 1, 2016 (SG) .......................... 10201601530U

(51) Int. Cl.
*G02B 6/00* (2006.01)
*G02B 6/122* (2006.01)
(Continued)

(52) U.S. Cl.
CPC ............ *G02B 6/1226* (2013.01); *B82Y 15/00* (2013.01); *G01J 1/42* (2013.01); *G02B 2006/12138* (2013.01)

(58) Field of Classification Search
CPC ........ G02B 6/1226; G02B 2006/12138; B82Y 15/00; G01J 1/42
(Continued)

(56) References Cited

U.S. PATENT DOCUMENTS 7,469,083 B2 * 12/2008 Todori .................. B82Y 20/00
                                                    385/14
8,866,007 B2 * 10/2014 Atwater ................ B82Y 20/00
                                                    136/257
(Continued)

OTHER PUBLICATIONS

Arielly, R., et al., "Accurate Determination of Plasmonic Fields in Molecular Junctions by Current Rectification at Optical Frequencies," Nano Letters, vol. 11, Jun. 16, 2011, pp. 2968-2972.
(Continued)

*Primary Examiner* — Seung C Sohn
(74) *Attorney, Agent, or Firm* — Cesari and McKenna, LLP; James A. Blanchette

(57) ABSTRACT

In one embodiment, an on-chip electronic-plasmonic transducer is provided that is capable of both direct plasmon generation and detection at high efficiencies. The electronic-plasmonic transducer includes a metal-insulator-metal junction formed from a first wire constructed of a first metal, a tunneling barrier material in contact with the first wire, and a second wire made from a second metal in contact with the tunneling barrier material. A plasmonic waveguide is formed as a contiguous part of the second wire, such that the waveguide is directly coupled to the MIM junction. The electronic-plasmonic transducer can both directly generate and detect plasmons, such that it may be configured on-chip as either a plasmon source or a plasmon detector. The electronic-plasmonic transducer may be used to form an on-chip plasmon-based frequency multiplier or plasmon amplifier, among other usages.

20 Claims, 15 Drawing Sheets

(51) Int. Cl.
*G01J 1/42* (2006.01)
*B82Y 15/00* (2011.01)
*G02B 6/12* (2006.01)

(58) Field of Classification Search
USPC .......................................... 250/214.1, 214 R
See application file for complete search history.

(56) References Cited

U.S. PATENT DOCUMENTS

2016/0225424 A1 8/2016 Qiu et al.
2016/0293722 A1 10/2016 Nijhuis et al.

OTHER PUBLICATIONS

Barnes, W. L., et al., "Surface Plasmon Subwavelength Optics," Nature Publishing Group, Nature, vol. 424, Aug. 14, 2003, pp. 824-830.
Brongersma, M. L., et al., "The Case for Plasmonics," Science, vol. 328, Apr. 23, 2010, pp. 440-441.
Camargo, E., Design of FET: Frequency Multipliers and Harmonic Oscillators, Artech House Publishers, Norwood, MA, 1998, pp. 1-116.
Falk, A. L., et al., "Near-Field Electrical Detection of Optical Plasmons and Single-Plasmon Sources," Macmillan Publishers Limited, Nature Physics, vol. 5, May 24, 2009, pp. 475-479.
Goodfellow, K. M., "Direct On-Chip Oprical Plasmon Detection with an Atomically Thin Semiconductor," American Chemical Society, ACS Publications, Nano Letters, vol. 15, Jun. 29, 2015, pp. 5477-5481.
Gramotnev, D. K., et al., "Plasmonics Beyond the Diffraction Limit," Macmillan Publishers Limited, Nature Photonics, vol. 4, Jan. 29, 2010, pp. 83-91.
Heeres, R.W., et al., "On-Chip Single Plasmon Detection," American Chemical Society, Nano Letters, vol. 10, Dec. 30, 2009, pp. 661-664.
Huang, K. C. Y., et al., "Electrically Driven Subwavelength Optical," Macmillan Publishers Limited, Nature Photonics, vol. 8, Feb. 23, 2014, pp. 1-6.
Kern, J., et al., "Electrically-Driven Optical Antennas," Nature Photonics, vol. 9, Aug. 15, 2015, pp. 1-14.
Koller, D. M., et al., "Organic Plasmon-Emitting Diode," Macmillan Publishers Limited, Nature Photonics, vol. 2, Sep. 28, 2008, pp. 684-687.
Lambe, J., "Light Emission from Inelastic Electron Tunneling," Physical Review Letters, vol. 37, No. 14, Oct. 4, 1976, pp. 923-925.
Neutens, P., et al., "Electrical Detection of Confined Gap Plasmons in Metal-Insulator-Metal Waveguides," Nature Photonics, vol. 3, Apr. 19, 2009, pp. 283-286.
Noy, G., et al., "Response of Molocular Junctions to Surface Plasmon Polaritons," Wiley-VCH Verlag GmbH & Co. KGaA, Weinheim, Angewandte Chemie Int. Ed., vol. 122, Jul. 6, 2010, pp. 5870-5872.
Ozbay, E., "Plasmonics: Merging Photonics and Electronics at Nanoscale Dimensions," Science, vol. 311, Jan. 13, 2006, pp. 189-193.
Parzefall, M., et al., "Antenna-Coupled Photon Emission From Hexagonal Boron Nitride Tunnel Junctions," Macmillan Publishers Limited, Nature Nanotechnology, vol. 10, Sep. 14, 2015, pp. 1058-1063.
Rai, P., et al., "Electrical Excitation of Surface Plasmons by an Individual Carbon Nanotube Transistor," Physical Review Letters, American Physical Society, vol. 111, 026804, Jul. 12, 2013, pp. 1-5.
Stolz, A., et al., "Nonlinear Photon-Assisted Tunneling Transport in Optical Gap Antennas," American Chemical Society, Nano Letters, vol. 14, No. 5, Apr. 3, 2014, pp. 1-25.
Tan, S. F., et al., "Quantum Plasmon Resonances Controlled by Molecular Tunnel Junctions," Science, vol. 343, Mar. 28, 2014, pp. 1496-1499.
U.S. Appl. No. 15/402,978, filed Jan. 10, 2017 by Xuepeng Qiu et al. for Techniques to Modulate Spin Orbit Spin Transfer Torques for Magnetization Manipulation, pp. 1-58.
Walters, R. J., et al., "A Silicon-Based Electrical Source of Surface Plasmon Polaritons," Macmillan Publishers Limited, Nature Materials, vol. 9, Dec. 6, 2009, pp. 21-25.
Ward, D. R., et al., "Optical Rectification and Field Enhancement in a Plasmonic Nanogap," Nature Nanotechnology, vol. 5, Sep. 2010, pp. 732-736.

* cited by examiner

HIGHLY EFFICENT ON-CHIP DIRECT ELECTRONIC-PLASMONIC TRANSDUCERS

RELATED APPLICATIONS

The present application claims priority to Singapore Patent Application No. 10201601530U, titled Highly Efficient On-Chip Direct Electronic Plasmonic Transducers, filed Mar. 1, 2016 by Applicant National University of Singapore, the contents of which are incorporated by reference herein in their entirety.

BACKGROUND

Technical Field

The present disclosure relates generally to plasmonics, and more specifically to electronic-plasmonic devices Background Information Optical circuit components can carry information with a capacity exceeding 1000 times that of electronic circuit components. However, the relatively large wavelength of light requires optical components to be too large to compete in size with the nanoelectronics used in modern high-speed integrated circuits ("chips"). To address this issue, there has been growing research into the use of plasmons, surface plasmon polaritons (SPPs) to create a hybrid of optics and electronics, which can take advantage of the small dimensions of nanoelectronics and the fast operating speed of optics. SPPs are infrared or visible-frequency electromagnetic waves, which travel along a metal-dielectric or metal-air interface. The waves involve both charge motion in the metal ("surface plasmons") and electromagnetic waves in the air or dielectric ("polaritons"). SSPs can be confined to sub-wavelength dimensions and can carry information at high speeds (e.g., >100 terahertz THz).

To this end, there is a need for circuit components that can excite and detect plasmons (i.e. electronic-plasmonic transducers). However, existing approaches for plasmon excitation and detection suffer a number of shortcomings that render them unsuitable for use in high-speed integrated circuits. Most existing approaches for on-chip plasmon excitation or detection are based on miniaturized semiconductors. The use of miniaturized semiconductors entails the extra step of electron-hole pair generation in the semiconductor, such that plasmon excitation or detection is indirect. The inefficiency of this extra step generally renders the devices unsuitable for high-speed applications.

There have been some attempts to directly generate plasmatic signals. However, the electron-to-photon conversion efficiencies achieved have been very low (e.g., only one photon generated per $10^4$-$10^7$ electrons), thereby rendering them unsuitable for use in practical applications. There have also been some separate attempts at the reverse process of modulating current flow directly in response to plasmonic signals. Again, however, the efficiencies achieved (here photon-to-electron conversion efficiencies) have been very low. Further, the attempts at direct plasmon generation and direct plasmon detection have involved different structures, such that the capabilities of generation and detection have not been both present in the same structure. An on-chip structure capable of both plasmon generation and detection by directed electrical means has yet to be demonstrated, much less one that achieves practical efficiencies suitable for high-speed integrated circuits.

Accordingly, there is a need for a new on-chip electronic-plasmonic transducer that can both directly generate and detect plasmons with high efficiencies.

SUMMARY

In one example embodiment, an on-chip electronic-plasmonic transducer is provided that is capable of both direct plasmon generation and detection at high efficiencies. The electronic-plasmonic transducer includes a metal-insulator-metal (MIM) junction formed from a first wire constructed of a first metal (e.g., aluminum (Al)), an tunneling barrier material in contact with the first wire (e.g., an aluminum oxide ($AlO_x$) layer, such as an $AlO_2$ layer), and a second wire made from a second metal (e.g., gold (Au)) in contact with the tunneling barrier material. A plasmonic waveguide is formed as a contiguous part of the second wire, such that the waveguide is directly coupled to the MIM junction. The electronic-plasmonic transducer can both directly generate and detect plasmons, such that it may be configured on-chip either as a plasmon source or as a plasmon detector. In response to a source bias between the wires of the MIM junction, a source current flows therebetween via quantum mechanical tunneling, and the MIM junction propagates SPPs along the plasmonic waveguide. In converse, a response current is produced between the wires of the MIM junction in response to received SPPs along the plasmonic waveguide, and resulting modulation of the detector bias. In some implementations, plasmon excitation and plasmon detection efficiencies of 10-20% efficiency (i.e. 1 in 5-10 tunneling electrons couple to a plasmon) may be achieved, which represents a $10^3$-$10^6$ increase over previous approaches.

The example on-chip electronic-plasmonic transducer described above may be used in a variety of manners in a high-speed integrated circuit (e.g., a processor). For example, the example on-chip electronic-plasmonic transducer may be incorporated into an interconnect, to reduce heating effects and capacitive currents. In one specific implementation, the example on-chip electronic-plasmonic transducer may be used in new type of plasmon-based frequency multiplier (e.g., a plasmon-based frequency doubler). In one embodiment of such device, a pair of electronic-plasmonic transducers are connected, such that a first MIM junction and is coupled to a second MIM junction and via a second plasmonic waveguide. Such a plasmon-based frequency multiplier may not require a bandpass filter to remove higher harmonics as typically necessary in transistor-based designs. Alternatively, in another specific implementation, the example on-chip electronic-plasmonic transducer may be used in as part of a plasmon amplifier.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION OF EXAMPLE EMBODIMENTS

Example On-Chip Electronic-Plasmonic Transducers

Figure 1A:
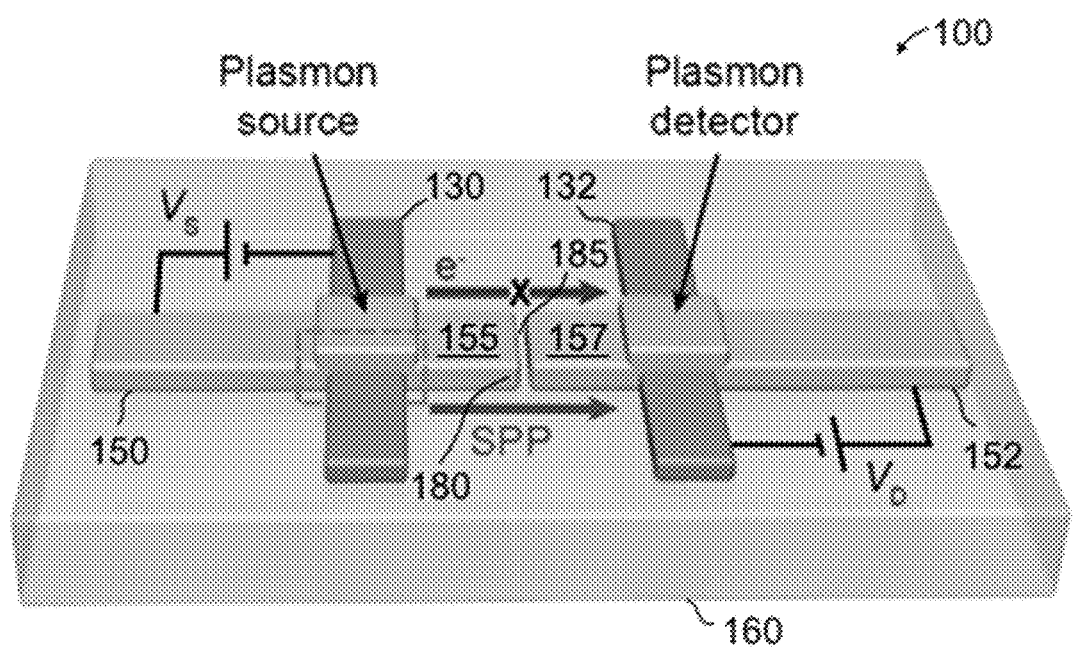
FIG. 1A is a schematic diagram of a pair of example on-chip electronic-plasmonic transducers.
Figure 1B:
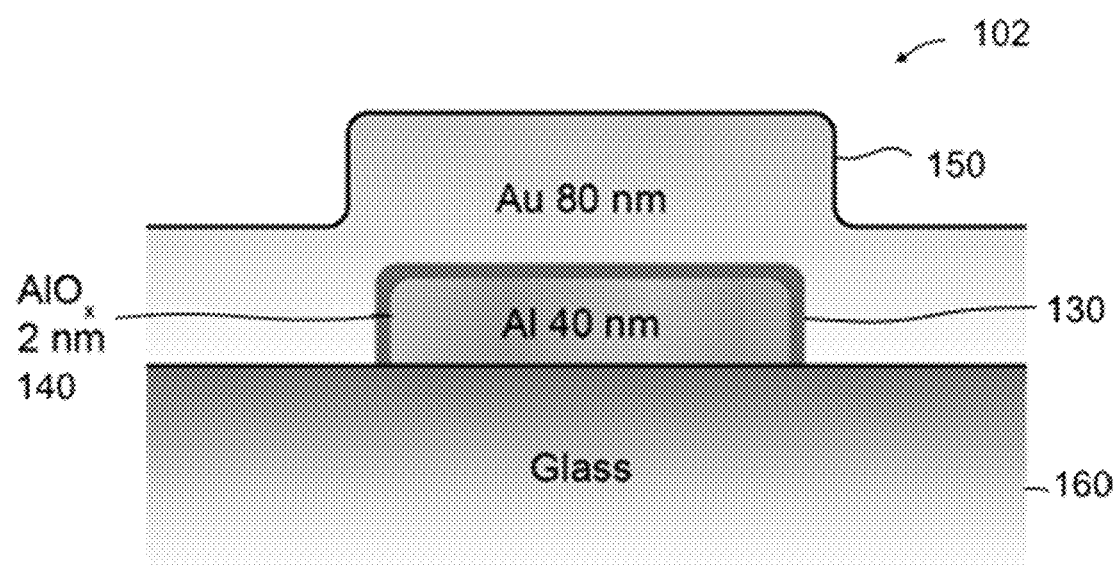
FIG. 1B is a cross-section view of one of the example electronic-plasmonic transducers of FIG. 1A cut along the dotted lines shown in the figure.

FIG. 1A is a schematic diagram 100 of a pair of example on-chip electronic-plasmonic transducers 110, 120. Each electronic-plasmonic transducers 110, 120 includes a MIM junction formed from a first wire (electrode) 130, 132 constructed of a first metal (e.g., Al) having a first thickness (e.g., 40 nanometers (nm)), a tunneling barrier material 140 in contact with the first wire (e.g., a native oxide layer, for example, an AlO$_x$ layer, such as an AlO$_2$ layer) having a second thickness (e.g., approximately 2 nm) and a second wire/electrode 150, 152 made from a second metal (e.g., Au) having a third thickness (e.g., 80 nm), laid on a substrate (e.g., glass) 160. This structure may be seen in FIG. 1B, which is a cross-section view 102 of one of the example electronic-plasmonic transducers of FIG. 1A cut along the dotted lines shown in the figure. It should be understood that while an Al/AlO$_x$/Au MIM junction is shown in FIGS. 1A and 1B, the electronic-plasmonic transducers may include MIM junctions constructed from a variety of different metals, metal-like materials and tunneling barrier materials, etc.

While the example electronic-plasmonic transducers 110, 120 are each identical and can function as plasmon source or a plasmon detector depending on its on-chip configuration, in the example shown in FIG. 1A the MIM junction of the first electronic-plasmonic transducer 110 is configured as a plasmon source and the MIM junction of the second electronic-plasmonic transducer 120 is configured as a plasmon detector. In the first electronic-plasmonic transducer 110, whose MIM junction is configured as a plasmon source, by applying a source bias $V_s$ between the wires, a source current flows as a result of quantum mechanical tunneling. Some of the electrons tunnel inelastically and lose energy to excite localized surface plasmons (LSPs) in the tunnel junction. The excited LSPs propagate SPPs along a portion 155 of the second wire 150 that serves as a plasmonic waveguide.

Figure 1C:
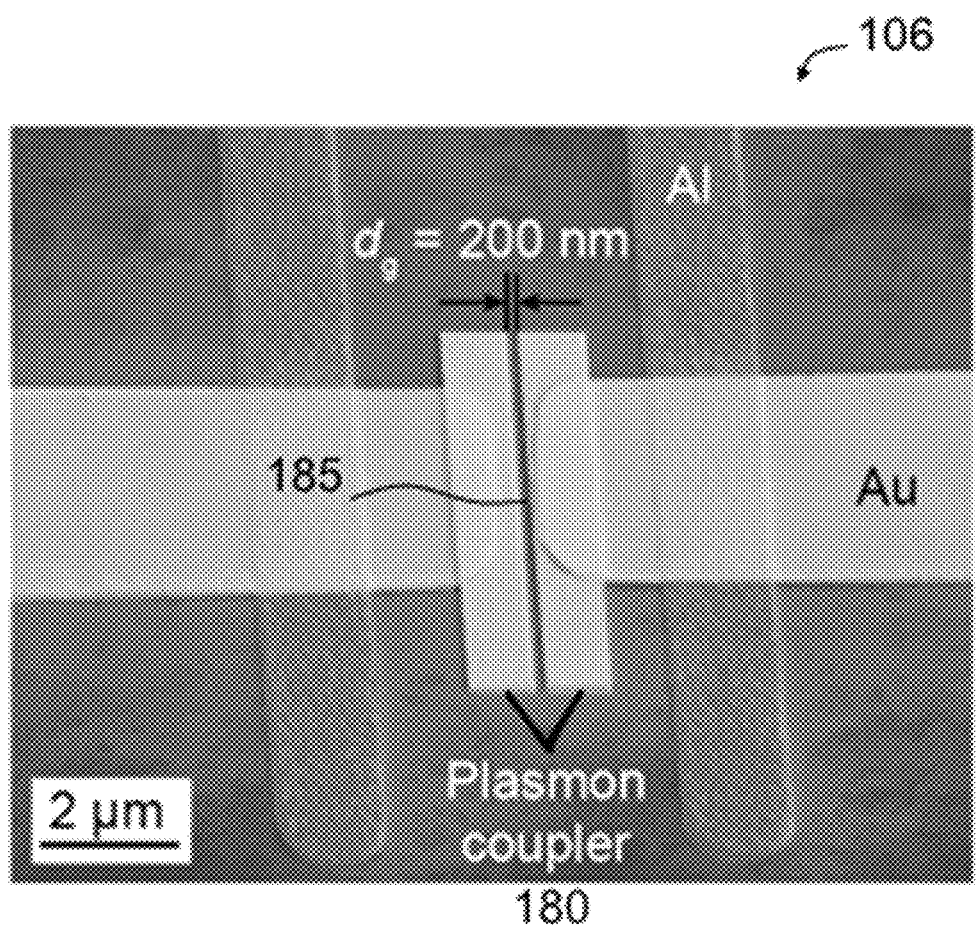
FIG. 1C is an image of the example on-chip electronic-plasmonic transducers from FIG. 1A, in which a plasmonic coupler having a gap is clearly visible.

The first electronic-plasmonic transducer 110 in FIG. 1A is coupled to the second electronic-plasmonic transducer 120 whose MIM junction is configured as a plasmon detector by a plasmonic waveguide. The plasmonic waveguide may include a plasmonic coupler disposed on wires 155, 157. The plasmonic coupler has a gap (e.g., a 200 nm gap) 185 so that the SPPs can propagate from the plasmon source to the plasmon detector but no current can flow. FIG. 1C is an image of the example on-chip electronic-plasmonic transducers 110, 120 from FIG. 1A, in which a plasmonic coupler 180 having a gap 185 is clearly visible. While a plasmonic coupler 180 with certain geometry is shown in FIG. 1B, it should be remembered that a variety of other types of plasmonic waveguides, including plasmonic couplers with different geometries and gap widths may be alternatively employed.

In the second electronic-plasmonic transducer 120 whose MIM junction is configured as a plasmon detector, a detector bias $V_D$ may be configured equal to the source bias $V_s$. A response current is produced between the wires 132-152 of the plasmon detector MIM junction in response to received SPPs along the plasmonic waveguide, being modulated responsive to source current changes.

Figure 2A:
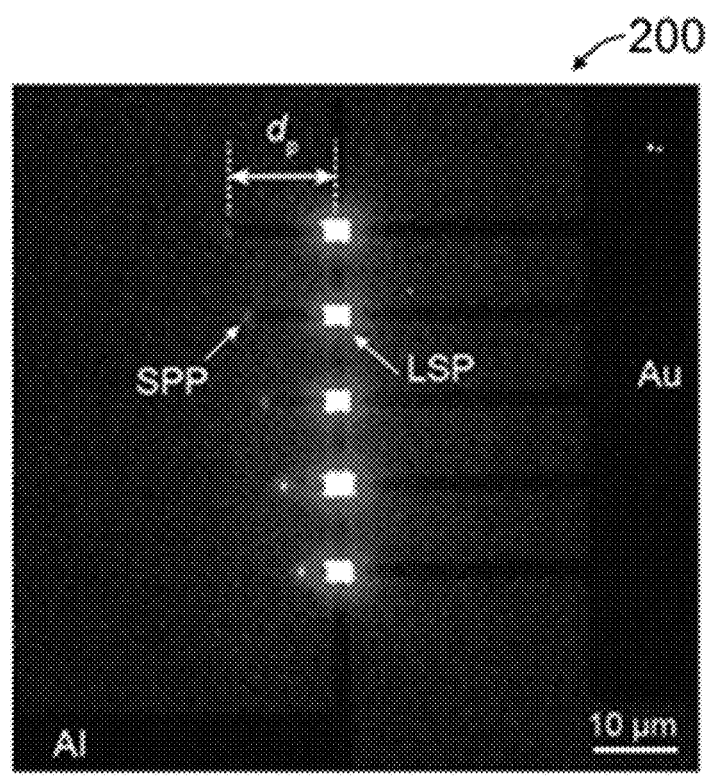
FIG. 2A is an example image of excitation of junction confined and SPPs for an example MIM junction with plasmonic waveguides of different lengths $d_{pw}$.

The ability of an MIM junction such as the example shown in FIG. 1A to excite LSPs and SPPs and all other possible plasmon modes, and function as a plasmon source may be demonstrated by experimental testing, for example conducted using leakage radiation microscopy. FIG. 2A is an example image 200 of excitation of junction confined and SPPs for an example MIM junction with plasmonic waveguides of different lengths $d_{pw}$. In this example, the source bias $V_S$ is −1.8 volts (V) and source current density $J_S$ is approximately 50 amps per square centimeter (A/cm$^2$). As can be seen, that plasmons are uniformly distributed in each tunnel junction area and propagating SPPs are readily scattered from the end of each waveguide.

Figure 2B:
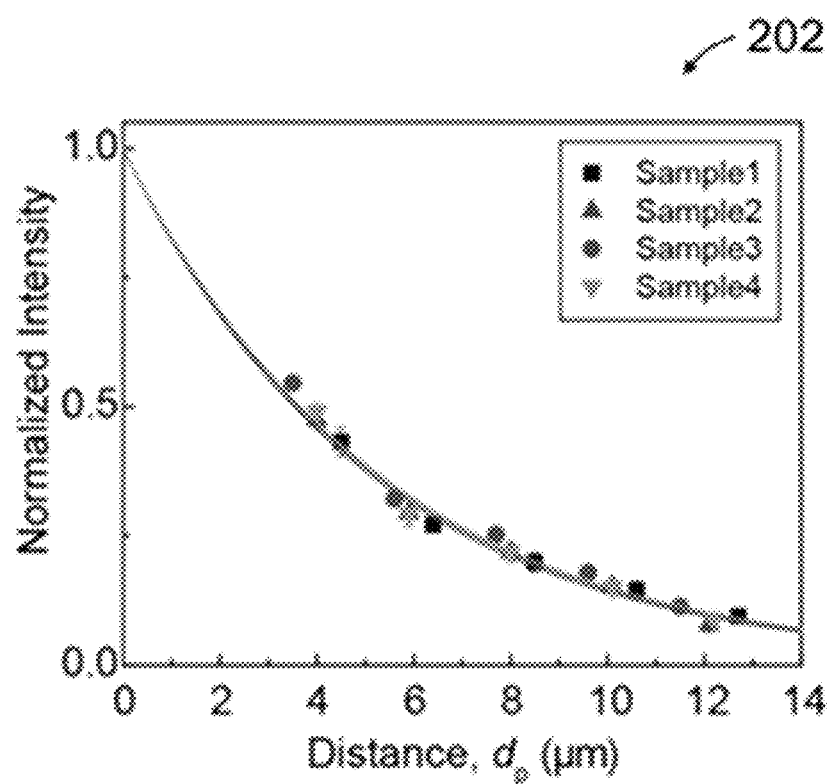
FIG. 2B is a plot showing example effects on normalized intensity of increasing plasmonic waveguide lengths $d_{pw}$.

For a MIM junction, when the maximum intensity of the SPP spot ($I_{SPP}$) is normalized with respect to that of the LSP spot ($I_{LSP}$), it can be seen that the normalized SPP intensity decays exponentially with increasing plasmonic waveguide lengths $d_{pw}$. FIG. 2B is a plot 202 showing example effects on normalized intensity of increasing plasmonic waveguide lengths $d_{pw}$. A curve may be fitted to the plot 202, represented as:

$$\frac{I_{SPP}}{I_{LSP}} = e^{\frac{d_{pw}}{L_{SPP}}} \quad (1)$$

Equation 1 yields a SPP propagation length $L_{SPP}$ of approximately 5.3 µm based on the data for the example described in FIGS. 2A and 2B.

Figure 2C:
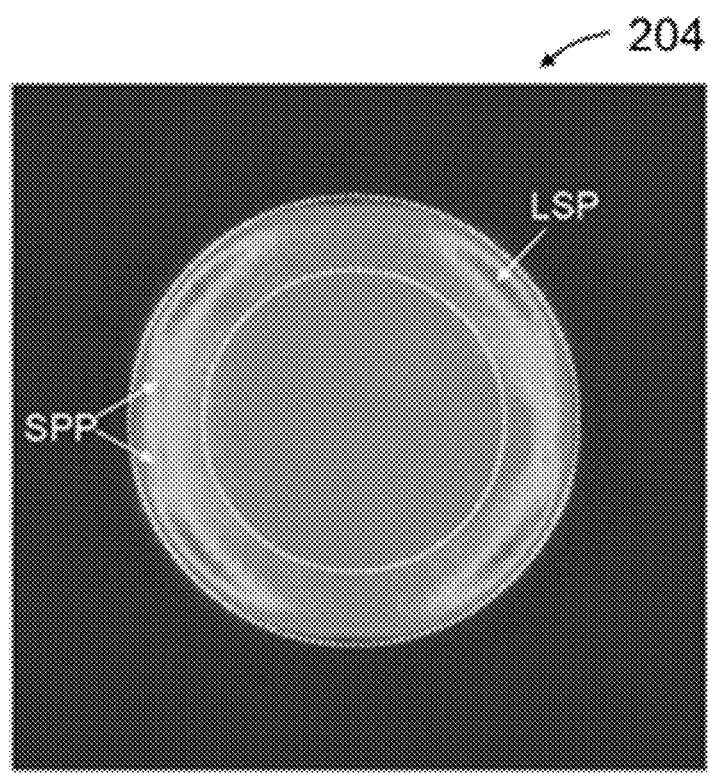
FIG. 2C is an example experimental back-focal plane image of plasmon emission.
Figure 2D:
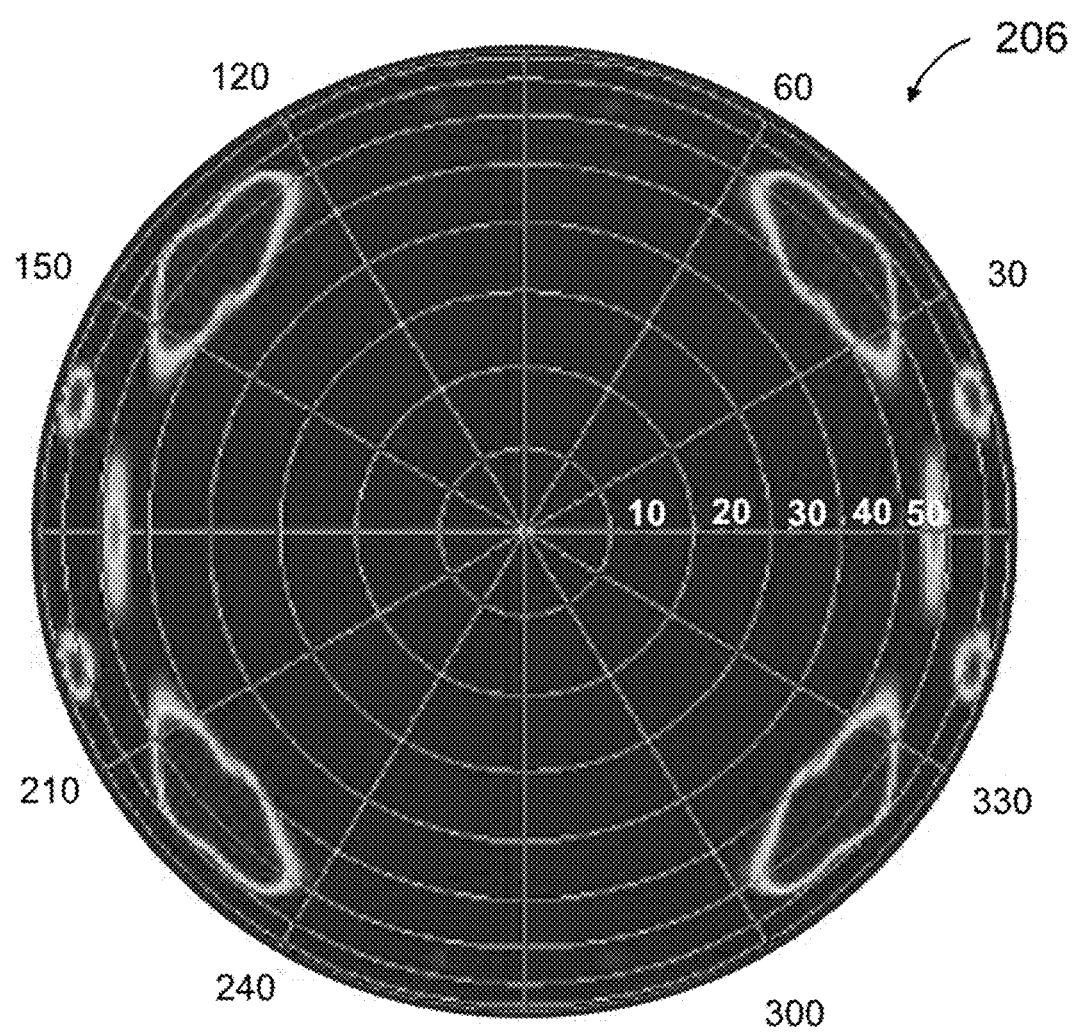
FIG. 2D is an example simulated back-focal plane image of plasmon emission resulting from finite-difference time-domain (FDTD) simulation.

FIG. 2C is an example experimental back-focal plane image 204 of plasmon emission. The inner dotted line 210 indicates critical angle and the outer dotted line 220 indicates numerical aperture (NA). FIG. 2D is an example simulated back-focal plane image 205 of plasmon emission resulting from FDTD simulation. Each image 204, 206 agrees and shows four bright lobes and four straight bars with weaker intensities. The four bright lobes result from the scattering of LSPs from the MIM junction and the straight bars result from the leakage radiation of the SPPs propagating along the waveguide. The SPPs with wave vector k approximately equal to 1.35 $k_0$ corresponds to the SPP mode propagating along the edge of the waveguide according to the FDTD simulation. The simulated image 206 also shows one SPP mode propagating with k equal to 1.6 $k_0$.

Figure 2E:
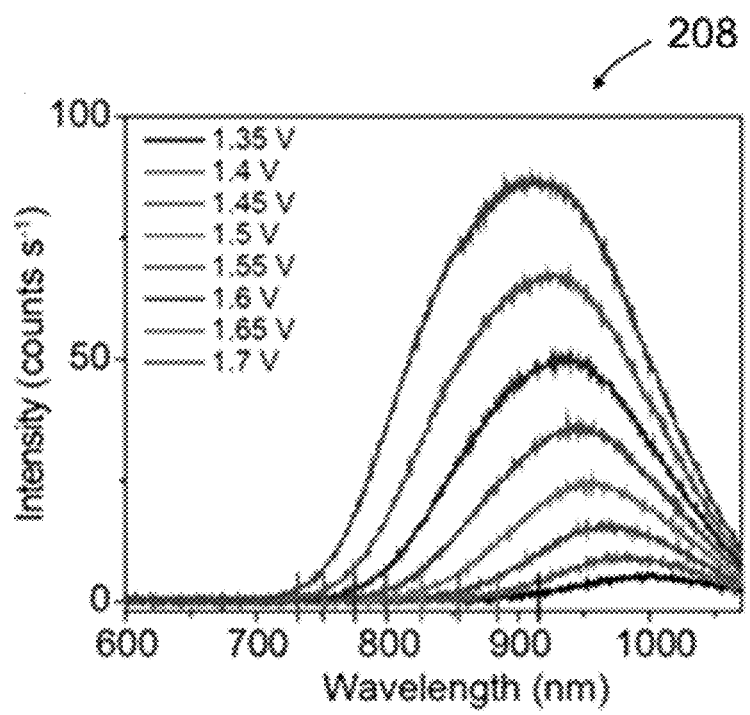
FIG. 2E is a plot of example spectra of plasmon emission excited at different biases.

Further, FIG. 2E is a plot 208 of example spectra of plasmon emission excited at different biases. The vertical bars indicate corresponding wavelength with energy $eV_{bias}$. Based on the data, the full width at half maximum (FWHM) is about 150 nm and the spectra blue shift with increasing bias following the quantum law $hv_{photon} < eV_{bias}$. From such data, it can be confirmed that the MIM junctions in an electronic-plasmonic transducer will excite plasmons and launch SPPs in a plasmonic waveguide.

Figure 2F:
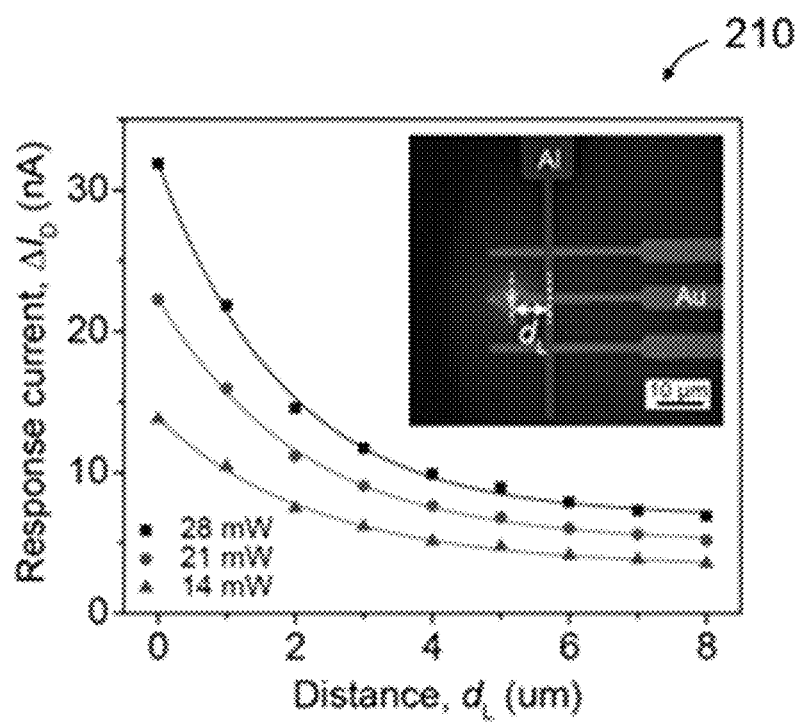
FIG. 2F is a combined image of a 638 nm laser (at different laser powers) focused on a waveguide at a distance $d_L$ from an example MIM junction and a plot of the change in response current $\Delta I_D$ with increasing distance $d_L$.

The ability of an MIM junction such as the example shown in FIG. 1A to produce a response current in response to received SPPs may also be demonstrated. FIG. 2F is a combined image 210 of a 638 nm laser (at different laser powers) focused on a waveguide at a distance $d_L$ from an example MIM junction and a plot of the change in response current $\Delta I_D$ with increasing distance $d_L$. As can be seen, the change in response current decays exponentially with increasing length. With this data, the decay length of $\Delta I_D$ is approximately 5 μm (at different laser powers) and close to the $L_{SPP}$ of the edge SPP mode.

Example On-Chip Plasmon-Based Frequency Multiplier

When the MIM junctions of a pair of on-chip electronic-plasmonic transducers 110, 120 is organized as shown in FIG. 1A, the resulting circuit operates as a frequency multiplier (e.g., a frequency doubler). SSPs excited at the MIM junction of the first electronic-plasmonic transducer 110 (the plasmon source) propagates via a plasmonic waveguide (e.g., that includes a plasmonic coupler 180) to the MIM junction of the second plasmonic transducer 120 (the plasmon detector). Since SPPs can be excited at multiple (e.g., both) bias polarities at the plasmon source, a sinusoidal response current is modulated multiple times (e.g., twice) per period of the source bias $V_S$ causing frequency multiplication (e.g., frequency doubling).

Figure 3A:
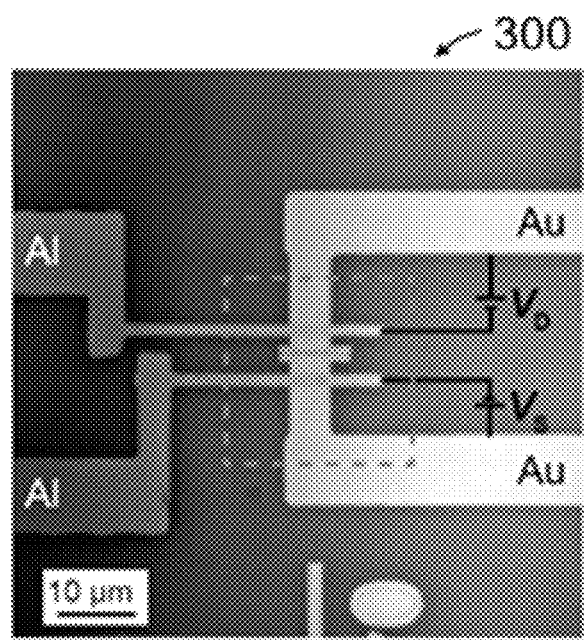
FIG. 3A is an optical image of example MIM junctions arranged as a frequency multiplier.
Figure 3B:
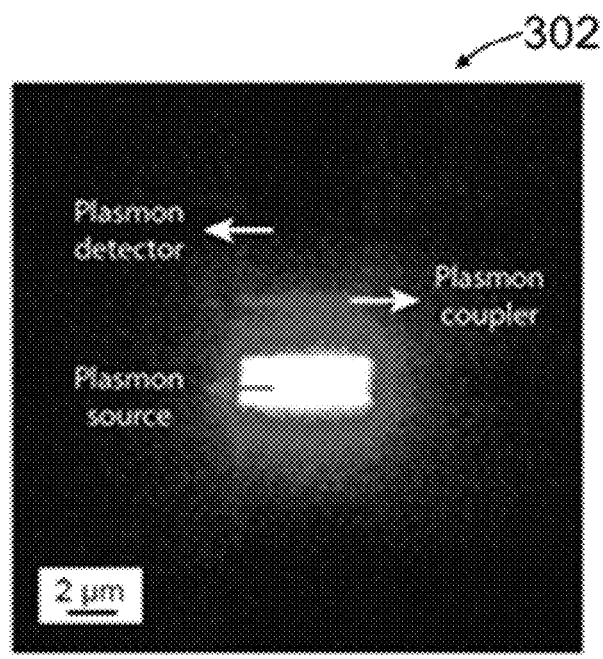
FIG. 3B is a plasmon emission image of the example arrangement in FIG. 3A.

The ability of a pair of MIM junctions to operate as a frequency multiplier (e.g., a frequency doubler) may be demonstrated by experimental testing. FIG. 3A is an optical image 300 of example MIM junctions arranged as a frequency multiplier. Likewise, FIG. 3B is a plasmon emission image 302 of the example arrangement in FIG. 3A. In FIGS. 3A and 3B, the source bias $V_s$ is −1.4 V (with source current $I_S$=28 A/cm$^2$ and detector bias $V_D$ equal to 0 V), respectively. The LSPs at the source junction and SPPs scattering from the gap of the plasmonic coupler are clearly visible.

Figure 3C:
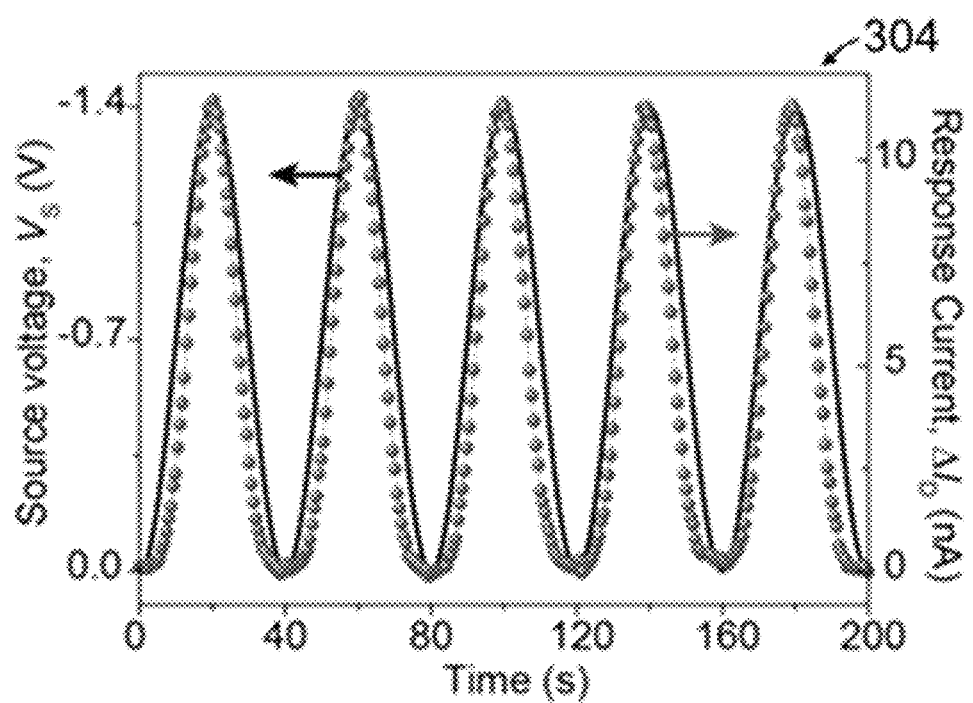
FIG. 3C is a time trace of a change in response current $\Delta I_D$ for an example sinusoidal source bias $V_S$ with maxima at 0 and −1.4 V and a constant detector bias $V_D$ at 0.5 V ($I_D$=2.65 A/cm$^2$).

FIG. 3C is a time trace 304 of a change in response current $\Delta I_D$ for an example sinusoidal source bias $V_S$ with maxima at 0 and −1.4 V and a constant detector bias $V_D$ at 0.5 V ($I_D$=2.65 A/cm$^2$). As can be seen in FIG. 3C, the change in response current $\Delta I_D$ faithfully follows the shape of the input signal, although the FWHM of the output signal approximately 10% smaller than that of the input signal because of the non-linear current response of the MIM junctions. However, given that the source bias is only at one polarity, no frequency doubling occurs.

Figure 3D:
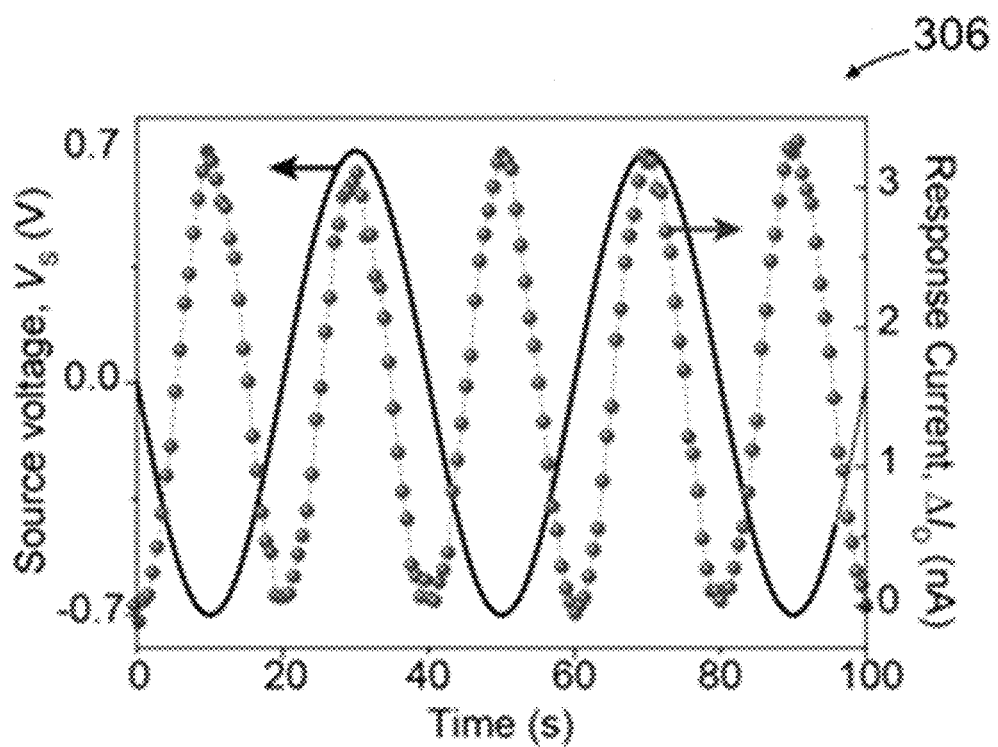
FIG. 3D is a time trace of the change in response current $\Delta I_D$ for an example sinusoidal source bias $V_S$ with maxima at −0.7 and 0.7 V and a constant detector bias $V_D$ at 0.5 V ($I_D$=2.65 A/cm$^2$)
Figure 3E:
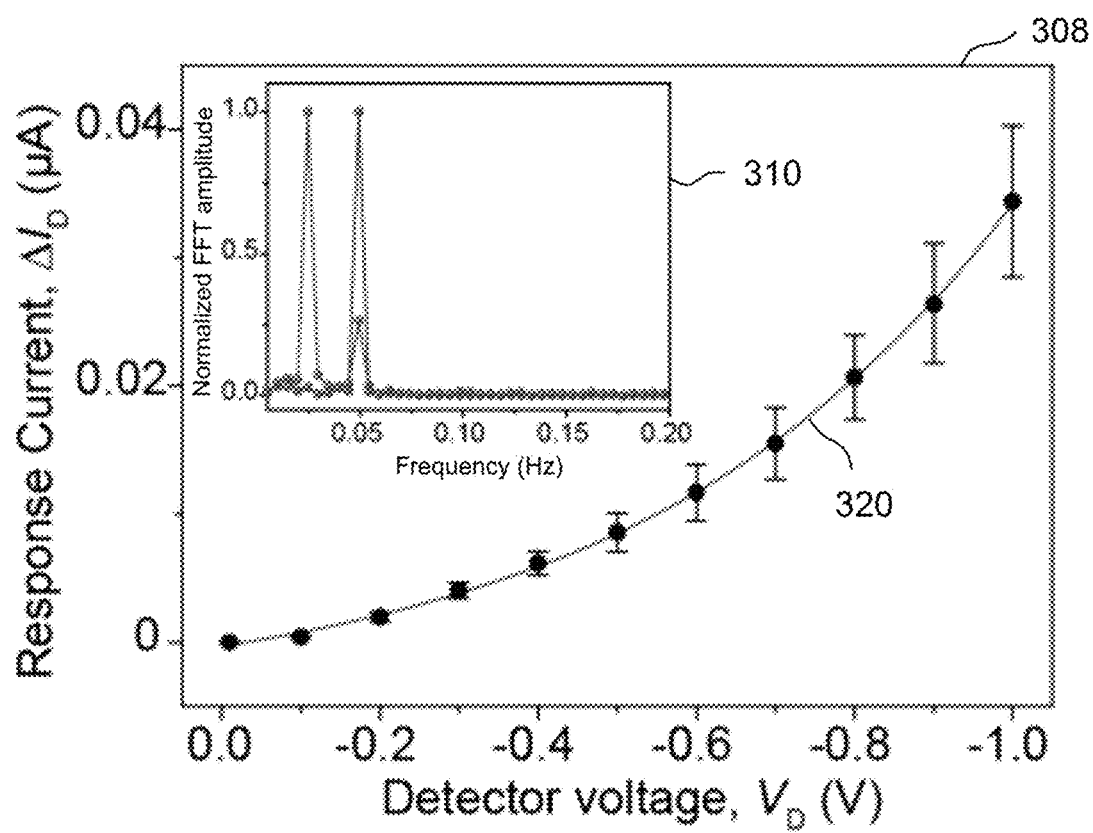
FIG. 3E is an example plot of change in response current $\Delta I_D$ as a function of detector bias $V_D$ for a source bias $V_S$ equal to −1.4 V, with an insert that shows normalized fast Fourier transform (FFT) amplitude.

FIG. 3D is a time trace 306 of the change in response current $\Delta I_D$ for an example sinusoidal source bias $V_S$ with maxima at −0.7 and 0.7 V and a constant detector bias $V_D$ at 0.5 V ($I_D$=2.65 A/cm$^2$). Since SPPs can be excited at both bias polarities at the source MIM junction, the sinusoidal $\Delta I_D$ is modulated twice per the period of the source bias $V_S$ and has twice the frequency of the source bias $V_S$. FIG. 3E is an example plot 308 of change in response current $\Delta I_D$ as a function of detector bias $V_D$ for a source bias $V_S$ equal to −1.4 V, with an insert 310 that shows normalized fast Fourier transform (FFT) amplitude. As can be seen from the insert 310, the Fourier transform shows no higher harmonics present in the output signal. Further, the output signal is symmetrical around zero bias indicating that plasmon excitation in the plasmon source is equally efficient at both bias polarities.

Figure 3F:
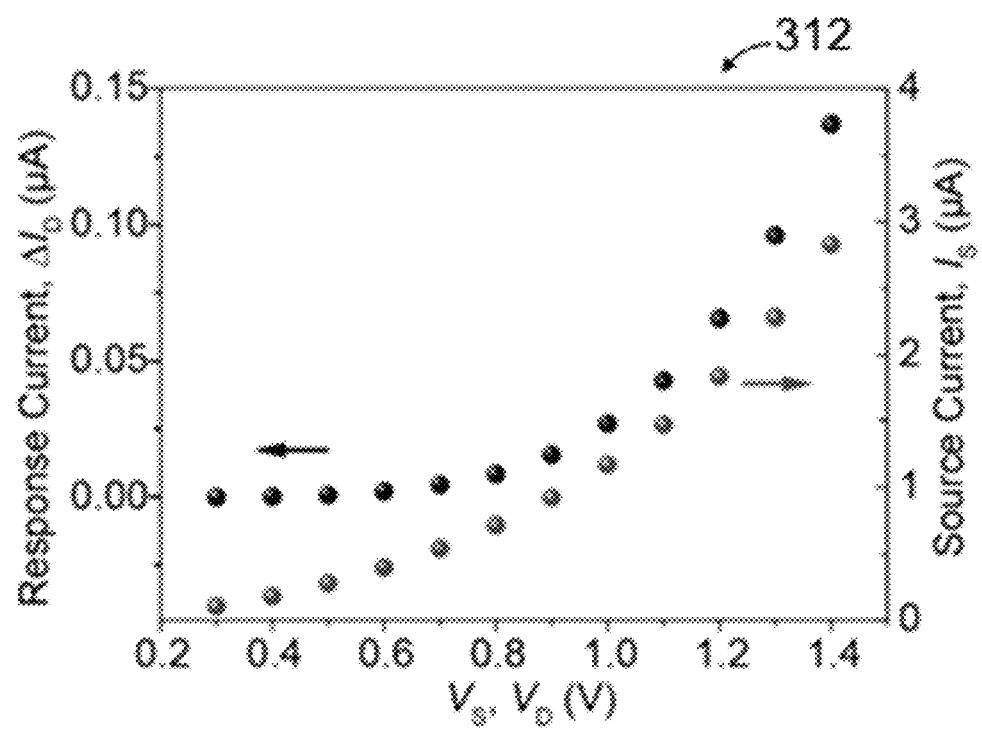
FIG. 3F is a plot of change in response current $\Delta I_D$ and source current $I_s$ as a function of source bias $V_S$ and detector bias $V_D$ equal to −1.4 V.

The overall efficiency $\eta_{overall}$ of the electronic-plasmonic frequency multiplier is measured as the combination of the efficiency of plasmon excitation, propagation and detection. Such quantity may be experimentally measured by determining $\Delta I_D$ as a function of source bias $V_S$ and detector bias $V_D$, while keeping source bias equal to detector bias, as $\Delta I_D$ depends on both $V_S$ and $V_D$. FIG. 3F is a plot of change in response current $\Delta I_D$ and source current $I_s$ as a function of source bias $V_S$ and detector bias $V_D$ equal to −1.4 V. Considering a plasmon propagation loss of a factor of 3-4 (judged from the $L_{SPP}$ and losses across the plasmonic coupler) a value of $\eta_{pt}$ of approximately 40% may be estimated (that is, one out of 2-3 electrons couple to a plasmon)

Plasmon-assisted tunneling may occur in the MIM junction of the plasmon detector leading to high efficiency values. When SPPs reach the detector junction, the plasmons induce an oscillating field $V_p$ that modulates the tunneling barrier height, and thus the tunneling current. The change in response current $\Delta I_D$ due to the oscillating field $V_p$ is calculated as:

$$\Delta I_D = I_{D+V_p} - I_D = \frac{1}{4} V_p^2 \left( \frac{I_D(V_D + \hbar\omega/e) + I_D(V_D - \hbar\omega/e) - 2I_D(V_D)}{(\hbar\omega/e)^2} \right) \quad (2)$$

The tunneling current varies slowly on the bias scale of $\hbar\omega/e$, thus equation (2) above may be further reduced to:

$$\Delta I_D = \frac{1}{4} V_p^2 \frac{d^2 I_D}{dV_D^2} \quad (3)$$

The line 320 in FIG. 3E represents the fit of equation (3) with oscillating field $V_p$ equal to 0.20 V, which indicates that change in response current $\Delta I_D$ is proportional to the second derivative of response current $I_D$ and that PAT is the main mechanism at work.

Alternatives

In conclusion, it should be understood that various adaptations and modifications may be made to the above discussed on-chip electronic-plasmonic transducers and on-chip plasmon-based frequency multiplier/plasmon amplifier made therefrom. It should be appreciated that details included in the various example embodiments are merely provided for purposes of illustration, and are not intended to limit the scope, applicability, or configuration of the invention. For example, it should be understood that the various structures described above may be made from differing materials, have differing sizes, be connected in different manners, be implemented in different combinations, or used for different purposes, etc. without departing from the intended scope of the invention.

What is claimed is:

1. An on-chip electronic-plasmonic transducer, comprising:
   a metal-insulator-metal (MIM) junction including
      a first wire constructed of a first metal,
      a tunneling barrier material in contact with the first wire, and
      a second wire constructed of a second metal in contact with the tunneling barrier material; and
   a plasmonic waveguide that is directly coupled to the MIM junction;
   wherein the MIM junction is capable of propagating surface plasmon polaritons (SPPs) along the plasmonic waveguide in response to a source current flowing between the wires of the MIM junction, or of producing a response current between the wires of the MIM junction in response to received SPPs along the plasmonic waveguide.

2. The on-chip electronic-plasmonic transducer of claim 1, wherein the plasmonic waveguide formed as a contiguous part of the second wire of the MIM junction.

3. The on-chip electronic-plasmonic transducer of claim 1, wherein the response currents flows in the MIM junction as a result of plasmon-assisted tunneling.

4. The on-chip electronic-plasmonic transducer of claim 1, wherein the first metal comprises aluminum (Al) and the tunneling barrier material comprises an aluminum oxide ($AlO_x$) layer.

5. The on-chip electronic-plasmonic transducer of claim 3, wherein the second metal comprises gold (Au).

6. The on-chip electronic plasmonic transducer of claim 1, wherein the electronic plasmonic transducer MIM junction that operates as a plasmon source is coupled to a second MIM junction that operates as a plasmon detector.

7. The on-chip electronic plasmonic transducer of claim 6, wherein the MIM junction is coupled to the second MIM junction via the plasmonic waveguide.

8. The on-chip electronic plasmonic transducer of claim 6, wherein the plasmonic waveguide includes a plasmonic coupler that allows propagation of SSPs but prevents current flow.

9. The on-chip electronic plasmonic transducer of claim 6, wherein the electronic plasmonic transducer is part of an on-chip plasmon-based frequency multiplier.

10. The on-chip electronic plasmonic transducer of claim 9, wherein the frequency multiplier is a frequency doubler.

11. The on-chip electronic plasmonic transducer of claim 6, is part of an on-chip plasmon amplifier.

12. An on-chip plasmon-based frequency multiplier, comprising
   a first metal-insulator metal (MIM) junction formed on a chip and directly coupled to a plasmonic waveguide, the first MIM junction operating as a plasmon source;
   a second MIM junction on the chip and directly coupled to the plasmonic waveguide, the second MIM junction operating as a plasmon detector,
   wherein the first MIM junction is configured to excite and propagate SPP along the plasmonic waveguide at multiple bias polarities to cause a response current at the second MIM junction to module multiple times per period of the source bias.

13. The on-chip plasmon-based frequency multiplier of claim 12, wherein the first plasmonic waveguide is coupled to the second plasmonic waveguide by a plasmonic coupler that includes a gap that allows propagation of surface plasmon polaritons (SSPs) but prevents current flow.

14. The on-chip plasmon-based frequency multiplier of claim 12, wherein the frequency multiplier is a frequency doubler.

15. The on-chip plasmon-based frequency multiplier of claim 12, wherein each MIM junction is formed from a first wire constructed of a first metal, a tunneling barrier material in contact with the first wire, and a second wire constructed of a second metal in contact with the tunneling barrier material, and wherein the plasmonic waveguide is formed as a contiguous part of the second wire of the respective MIM junction.

16. The on-chip plasmon-based frequency multiplier of claim 15, wherein the first metal comprises aluminum (Al) and the tunneling barrier material comprises an aluminum oxide ($AlO_x$) layer.

17. The on-chip plasmon-based frequency multiplier of claim 15, wherein the second metal comprises gold (Au).

18. A method for exciting or detecting plasmons using an on-chip electronic-plasmonic transducer, comprising:
   exciting plasmons at the MIM junction by
      applying a bias between a first wire and a second wire of a metal-insulator metal (MIM) junction to cause a source current to flow as a result of quantum mechanical tunneling, and
      propagating surface plasmon polaritons (SPPs) resulting from the quantum mechanical tunneling along a plasmonic waveguide that is directly coupled to the MIM junction; or
   detecting plasmons at the MIM junction by
      receiving SPPs along the plasmonic waveguide that is directly coupled to the MIM junction, and
      modulating a response current between the first wire and the second wire of the MIM junction in response to the received SPPs.

19. The method of claim 18, wherein the MIM junction is configured as a plasmon source that executes the step of exciting plasmons and is coupled to a second MIM junction via a plasmonic coupler to form a plasmon-based frequency doubler.

20. The method of claim 19, further comprising:
   detecting plasmons at the second MIM junction by
      receiving SPPs along a plasmonic waveguide of the second MIM junction, and
      modulating a response current at the second MIM junction in response to the received SPPs.

* * * * *